(12) United States Patent
Dubois et al.

(10) Patent No.: US 11,542,891 B2
(45) Date of Patent: Jan. 3, 2023

(54) TURBOMACHINE WITH COAXIAL PROPELLERS

(71) Applicant: SAFRAN AIRCRAFT ENGINES, Paris (FR)

(72) Inventors: Adrien Dubois, Moissy-Cramayel (FR); Anthony Binder, Moissy-Cramayel (FR); Laurence Francine Vion, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 44 days.

(21) Appl. No.: 17/264,234

(22) PCT Filed: Jul. 26, 2019

(86) PCT No.: PCT/FR2019/051856
§ 371 (c)(1),
(2) Date: Jan. 28, 2021

(87) PCT Pub. No.: WO2020/025886
PCT Pub. Date: Feb. 6, 2020

(65) Prior Publication Data
US 2021/0317799 A1    Oct. 14, 2021

(30) Foreign Application Priority Data
Aug. 3, 2018   (FR) ........................... 1857285

(51) Int. Cl.
*F02K 3/072*   (2006.01)
*F02C 6/08*   (2006.01)

(52) U.S. Cl.
CPC ............... *F02K 3/072* (2013.01); *F02C 6/08* (2013.01); *F05D 2240/128* (2013.01); *F05D 2260/606* (2013.01); *F05D 2260/96* (2013.01)

(58) Field of Classification Search
CPC .......... F02K 3/065; F02K 3/072; F01D 5/186; F01D 5/187; F05D 2270/17
See application file for complete search history.

(56) References Cited

U.S. PATENT DOCUMENTS 2,156,133 A    4/1939   Troller
5,480,284 A *  1/1996   Wadia ................... F01D 25/32
                                                        416/91

(Continued)

FOREIGN PATENT DOCUMENTS

EP    2090765 A2    8/2009
FR    2866931 A1    9/2005

OTHER PUBLICATIONS

International Search Report received for PCT Patent Application No. PCT/FR2019/051856, dated Nov. 20, 2019, 5 pages (2 pages of English Translation and 3 pages of Original Document).

*Primary Examiner* — Todd E Manahan
*Assistant Examiner* — Thuyhang N Nguyen
(74) *Attorney, Agent, or Firm* — Womble Bond Dickinson (US) LLP

(57) ABSTRACT

The invention relates to a nubomachine with a longitudinal axis, comprising two, respectively upstream (122) and downstream, coaxial outer propellers (122), characterised in that at least some of the blades (148) of the upstream propeller (122) comprise at least one internal air circulation chimney (150) that communicates with air-bleeding openings (152) in tire boundary layers of the blades (148), and communicates with air outflow openings (158) on the radially outer end thereof, the air-bleeding openings (152) leading to opening inlets (152a) on tire passive surfaces (156) of the blades (148), the inlets (152a) of the air-bleeding openings being radially arranged in an area (H1) contained between 10% and 45% of the radial dimension (H2) of the blades (148), measured above turd from the (Continued)

radial height of the blades for which the tangent of the leading edge (138) of the blades is orthogonal to the longitudinal axis, and the inlets (152*a*) of the air bleeding openings being arranged in an area contained between 0% and 30% of the local chord of the blades (148), measured at the level of said inlets (152*a*) and from the leading edges (138) of tire blades (148).

12 Claims, 4 Drawing Sheets

(56) References Cited

U.S. PATENT DOCUMENTS

| | | | |
|---|---|---|---|
| 8,454,310 B1* | 6/2013 | Downs | F01D 5/20 |
| | | | 416/97 R |
| 8,764,381 B2* | 7/2014 | Stern | F02K 3/072 |
| | | | 416/97 R |
| 2010/0054913 A1* | 3/2010 | Morel | B64C 21/04 |
| | | | 415/68 |
| 2011/0083417 A1 | 4/2011 | Keating | |
| 2012/0107133 A1* | 5/2012 | Bulin | B64D 15/04 |
| | | | 416/96 R |
| 2017/0370228 A1* | 12/2017 | Xu | F01D 5/145 |

\* cited by examiner

TURBOMACHINE WITH COAXIAL PROPELLERS

TECHNICAL FIELD

The present invention relates to a turbomachine of the type with coaxial propellers, such as ducted or unducted (open rotor or unducted fan).

BACKGROUND

The prior art comprises, in particular, the documents EP-A1-2090765, FR-A2-2866931 and U.S. Pat. No. 2,156,133.

The current trend for civil aircraft engines is to reduce specific fuel consumption (SC), noise pollution and NOx emissions. One of the technical solutions adopted by engine manufacturers is to increase the bypass ratio between primary flow and secondary flow. In this respect, several architectures such as Ultra High Bypass Ratio (UHBR) engines and twin propeller engines ("CROR" for Counter Rotating Open-Rotor, or "USF" for Unducted Single Fan) are being considered as potential replacements for current turbomachines for medium-haul flights.

The nacelle, which channels the secondary flow to produce most of the thrust on a conventional turbomachine, is removed in the case of an open rotor type turbomachine. The propulsion system then consists of an upstream propeller that drives the flow and a downstream propeller, fixed for the "USF" engine and rotating for the "CROR" engine, the downstream propeller enabling the flow to be straightened. The propulsive efficiency of the engine is improved by recovering the energy in rotation. The diameter of the propellers is also greatly increased to allow large quantities of air to be sucked in and improve propulsive efficiency. However, in the absence of a nacelle, the noise emissions are a major drawback of this open rotor architecture, particularly the noise generated by the propellers and by the various interactions between the propellers and the components involved in mounting the engine on the aircraft.

The main source of noise is linked to the interaction of the swirl coming from the upstream propeller with the downstream propeller. The top swirl is the result of the fusion of a tip blade swirl with a leading edge swirl that develops from the medium part (i.e. "belly") of the suction side of the upstream blade.

A solution to suppress this noise, called "clipping", consists of reducing the outer diameter of the downstream propeller so that the swirls generated by the upstream propeller pass outside the downstream propeller, in particular outside the cylinder formed by the rotating downstream propeller, and do not interact with it. However, this solution is not totally satisfactory because it results in a reduction in the thrust produced by the downstream propeller and therefore a reduction in the performance of the turbomachine. It would be possible to increase the load on the downstream propeller to compensate for the reduction in its diameter, but this propeller would then become mechanically more complex to make and would generate greater inherent noise.

The purpose of the invention is to provide a simple, effective and economical solution to this problem.

DISCLOSURE OF THE INVENTION

The object of the invention is thus a turbomachine, with a longitudinal axis, comprising two, respectively upstream and downstream, coaxial outer propellers.

In the turbomachine according to the invention, at least some of the blades of the upstream propeller comprise at least one internal air circulation chimney that communicates on the one hand with air-bleeding orifices in the boundary layers of the blades, and that communicates on the other hand with air outflow orifices on the radially outer end thereof, the air-bleeding orifices opening at the orifice inlets on the suction sides of the blades, the inlets of the air-bleeding orifices being radially arranged in an area contained between 10% and 45% of the radial dimension of the blades, measured above and from the radial height of the blades for which the tangent of the leading edge is orthogonal to the longitudinal axis, the inlets of the air-bleeding orifices being arranged in an area contained between 0% and 30%, preferably contained between 10% and 30%, of the local chord of the blades, measured at the level of said inlets and from the leading edges of the blades.

Thus, the specific positioning of the inlets of the air-bleeding orifices makes it possible to reduce at the source the intensity of the swirl which develops at the level of the upstream propeller by bleeding it before it binds to the top swirl of the blades.

The air-bleeding orifices are arranged radially below the air outflow orifices and are connected thereto by substantially radial chimneys formed inside the blades. The chimneys may be arranged differently, for example in a zig-zag path inside the blades. The bleeding orifices are therefore arranged at radii or radial distances from the shaft of the engine which are smaller than those of the outlet orifices so that there is a sufficient pressure difference between the inlet and outlet of the internal chimneys of the blades. During operation, the centrifugal forces and pressure differences between the air inlet and outlet areas are sufficient to ensure that the bleed air is conveyed through the chimneys of the blades to the outlet orifices. The air exiting from these orifices is discharged outside the upstream propeller blades and destroys the coherence of the low intensity swirls generated by the upstream propeller.

The invention therefore does not require modifying the dimensions of the upstream and downstream propellers, which can have approximately the same outer diameter.

The air-bleeding is carried out on the suction side of the blades where the turbulence in the boundary layers is the greatest. Alternatively, the air-bleeding orifices can open at the pressure sides of the blades, or even to both the pressure sides and suction sides of the blades. The air pressure on the pressure sides of the blades has the advantage that it is higher than on their suction sides. However, the boundary layers on the pressure side are generally healthier. The air-bleeding on the pressure sides of the blades is therefore not always necessary.

Advantageously, the inlets of the air-bleeding orifices are only arranged in said areas H1 and L1 of the blades of the upstream propeller.

Said at least one internal air circulation chimney can be substantially radial.

The air-bleeding orifices may have an elongated or oblong cross-section.

The air outflow orifices may open at the outside of the blades at the level of the orifice outlets, said orifice outlets being arranged in an area contained between 0% and 60% (preferably 0% to 15%) of the local chord of the blades, measured at the level of said outlets and from the leading edges of the blades, so as to benefit from an area where the pressure is lower than at the inlet orifice. The air outflow orifices may open at the outside of the blades at the orifice outlet, said outlets being arranged radially in an area H3 contained between 85% and 100% of the radial dimension of the blades, and measured from the roots of the blades.

Advantageously, said air outflow orifices are arranged only in said area H3 of the radial dimension of the blades.

The air outflow orifices advantageously open at the suction sides of the blades.

The air outflow orifices can be directed towards the top of the blades so that, in axial section, the angle between the radial axis of the blades and the direction of air ejection is between 0° and 90°.

The air outflow orifices can be oriented on the side of the suction sides of the blades in such a way that, in radial section, the angle between the radial axis of the blades and the direction of air ejection is between 0° and 90°.

The upstream and downstream propellers can have substantially the same outer diameter.

The upstream and downstream propellers may be unducted and counter-rotating.

The upstream and downstream propellers can be ducted and counter-rotating or non counter-rotating.

DESCRIPTION OF FIGURES

The invention will be better understood and other details, characteristics and advantages of the invention will appear when reading the following description made as a non-limitative example and with reference to the annexed drawings in which.

DETAILED DESCRIPTION

Figure 1:
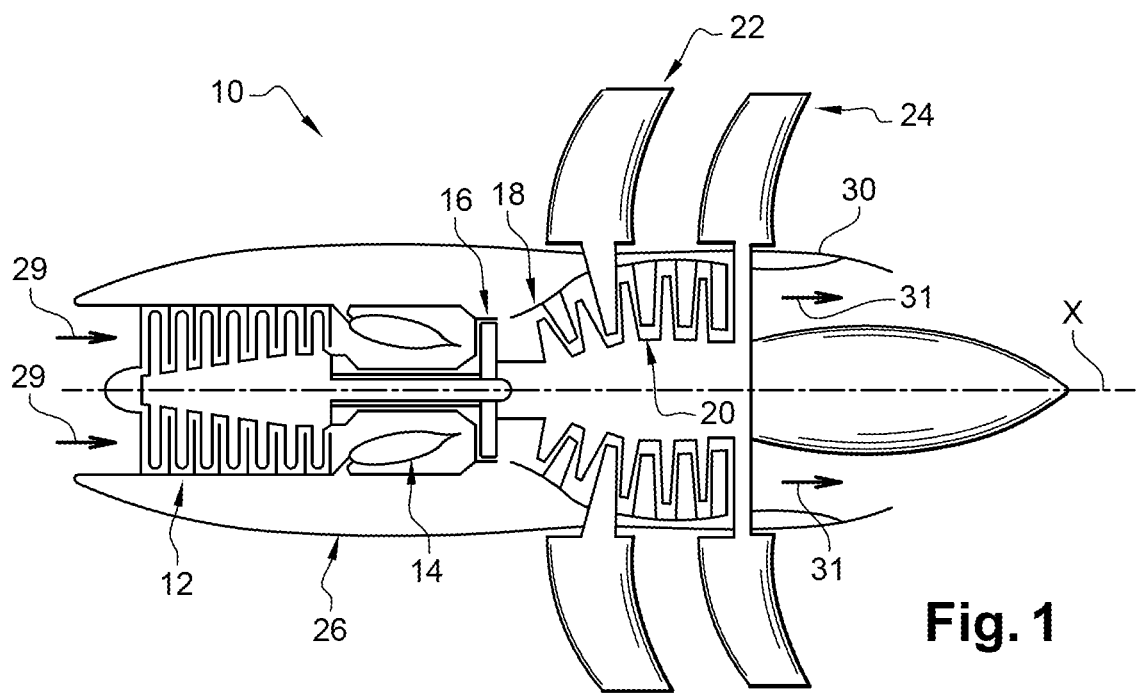
FIG. 1 is a schematic axial section view of a turbomachine with unducted propellers.

FIG. 1 shows a turbomachine 10 with undetected propellers (unducted fan or open rotor) which comprises, from upstream to downstream, in the direction of gas flow inside the turbomachine, a compressor 12, an annular combustor 14, a high-pressure upstream turbine 16, and two low-pressure downstream turbines 18, 20 which are counter-rotating, i.e. they rotate in opposite directions around the longitudinal axis X of the turbomachine.

Each of these downstream turbines 18, 20 is secured in rotation to an outer propeller 22, 24 which extends radially outside the nacelle 26 of the turbomachine, this nacelle 26 being substantially cylindrical and extending along the axis X around the compressor 12, the combustion chamber 14, and the turbines 16, 18 and 20.

The air flow 29 entering the compressor 12 is compressed and then mixed with fuel and burned in the combustion chamber 14, the combustion gases then being injected into the turbines to rotate the propellers 22, 24 which provide most of the thrust generated by the turbomachine. The combustion gases (arrows 31) exit the turbines and are finally expelled through a nozzle 30 to increase this thrust.

The propellers 22, 24 are arranged coaxially one behind the other. In a known manner, each of these propellers 22, 24 comprises a plurality of blades which are evenly distributed around the axis X of the turbomachine, each blade extending substantially radially and comprising an upstream leading edge, a downstream trailing edge, a radially inner end forming the root of the blade, and a radially outer end forming the top of the blade.

The upstream propeller 22 has substantially the same diameter as the downstream propeller 24 so that these propellers provide the same thrust in operation and the entire airflow passing between the blades of the upstream propeller also passes between the blades of the downstream propeller.

Figure 2:
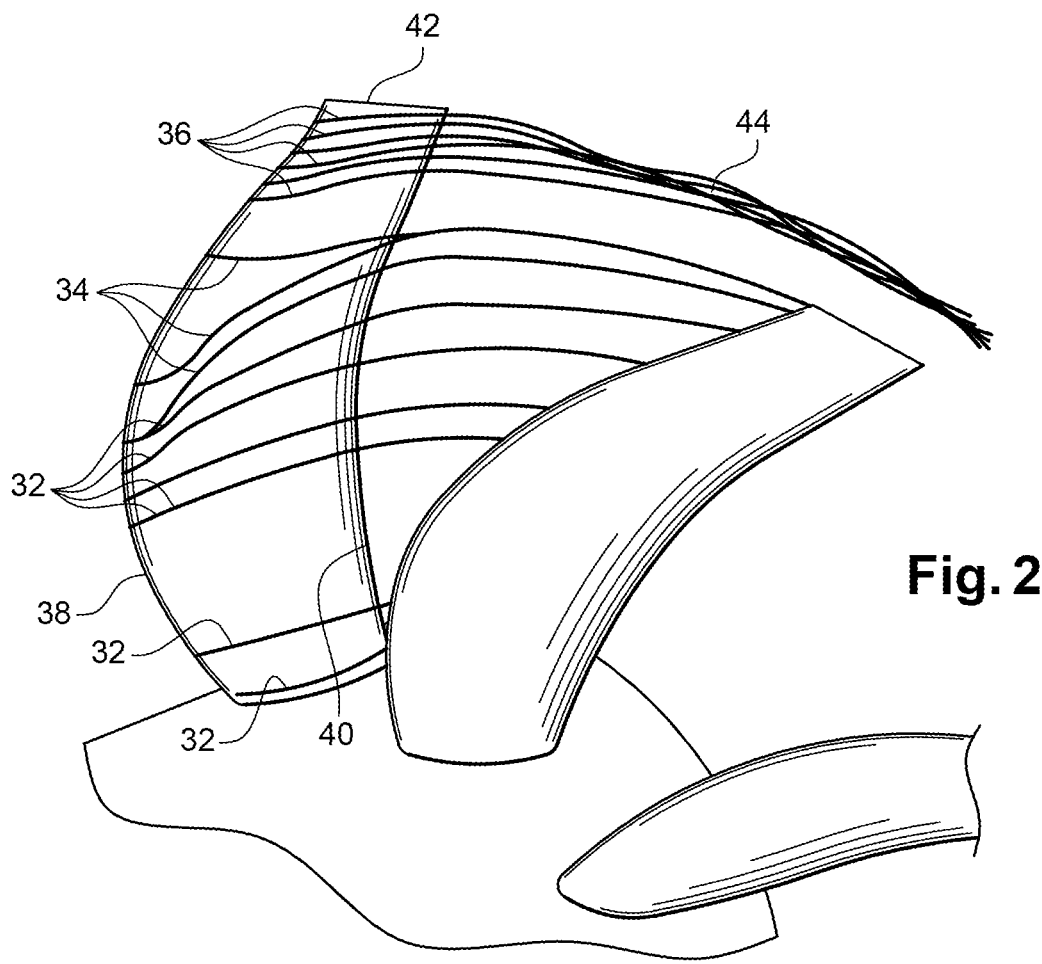
FIG. 2 is a partial schematic perspective view of the upstream propeller of a turbomachine with unducted propellers according to the prior art.

FIG. 2 is a partial schematic perspective view of the upstream propeller 22 of a turbomachine of the prior art, and shows the evolution of the power lines on a blade of this propeller. The power lines 32, 34, 36 pass between the propeller blades and more or less follow the profile of the blades, from the leading edges 38 to the trailing edges 40 of the blades.

Figure 3:
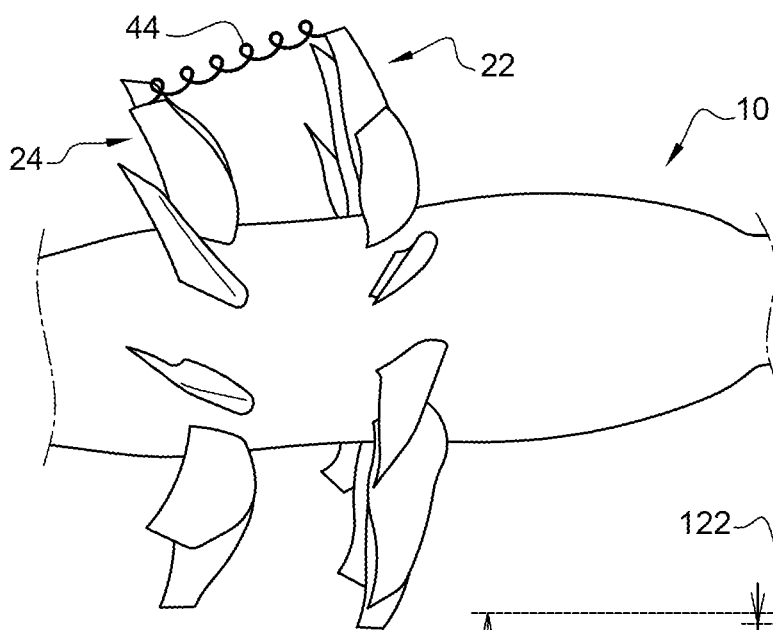
FIG. 3 is a schematic view of an unducted propeller turbomachine according to the prior art.

The power lines 32 flowing over the radially inner end portions of the blades are substantially parallel to each other. In contrast, the power lines 34, 36 flowing on the radially outer end portions tend to converge towards each other, this phenomenon which becomes more intense as one approaches the tops 42 of the blades. The power lines 36 passing at the blade tops wind up around each other and form swirls 44 which impact the blades of the downstream propeller 24 (FIG. 3), these impacts being at the origin of very high noise pollution.

The purpose of the invention is to reduce, at the source, the intensity of the swirl that develops at the power lines 34 of the blades of the upstream propeller 22, by sucking this swirl before it binds to the top swirl formed by the power lines 36. The invention also aims to reduce the intensity of the top swirl.

The invention proposes to equip the blades of the upstream propeller 22 with air suction or air-bleeding orifices in the boundary layers of the blades, in central areas of the suction sides close to the leading edges 38, the air bleed being then ejected outside the upstream propeller 22 to destructure the swirls 42 of lower intensity which form at the blade tops.

Figure 4:
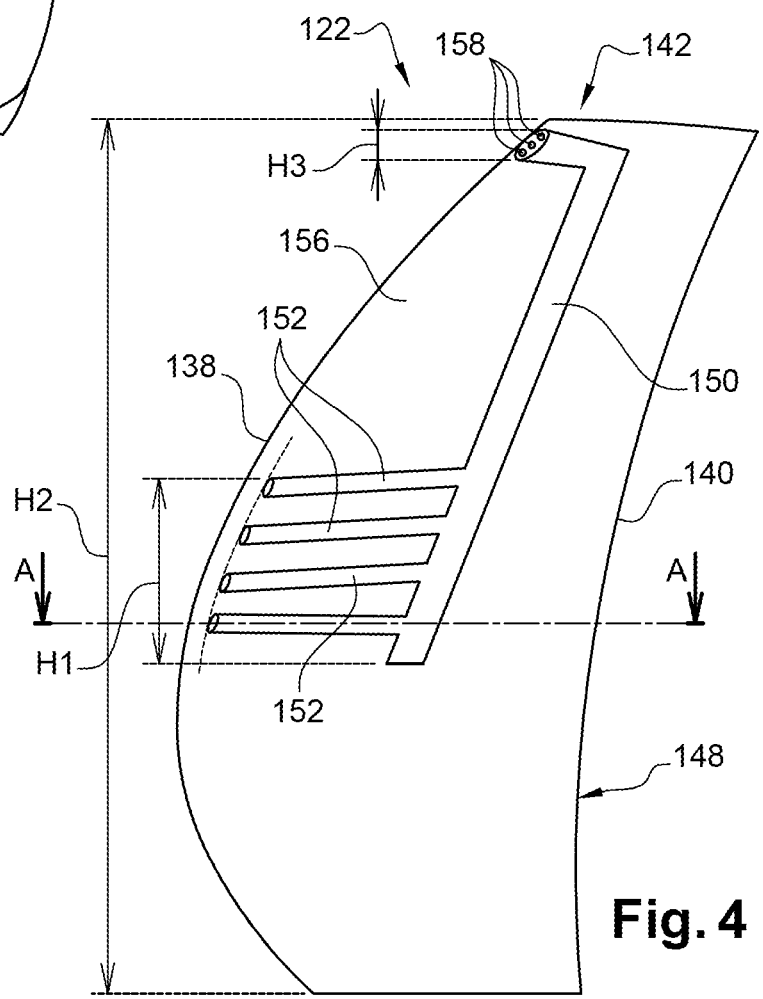
FIG. 4 is a schematic axial section view of a blade of the upstream propeller of a turbine with unducted propellers according to the invention.
Figure 5:
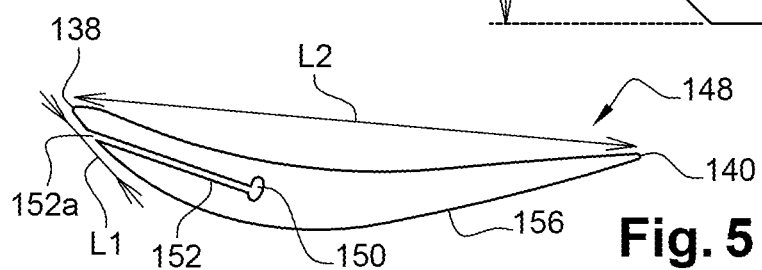
FIG. 5 is a sectional view according to the line A-A in FIG. 4.

As shown in FIGS. 4 and 5, the blades of the upstream propeller 122 comprise at least one internal air circulation chimney 150 which communicates on the one hand with air-bleeding orifices 152 passing through the side walls of the blades and opening at the suction sides 156 of these blades, and on the other hand with air bleed outlet orifices 158 which lead close to the tops 142 of the blades. The air-bleeding orifices 152 will allow the swirl to be sucked in as soon as it starts to develop, in particular between 50% and 60% of the radial dimension (the span) H2 of the blades. Thus, the swirl generated by the blades of the upstream propeller 122 will be of lower energy and of reduced diameter, and the section of swirl impacting the downstream propeller blade will thus be reduced. The interaction noise will thus be greatly reduced.

In order for all air-bleeding orifices 152 to be active, i.e. to suck in the swirl, there must be a positive pressure difference between the inlet of the orifices 152 and where they open to. To achieve this, each air-bleeding orifice 152 is in the form of a channel which is connected to an internal air circulation chimney 150 which runs inside the blade and opens close to its peak 142, e.g. close to the leading edge, and on the suction side 156, where the pressure is lower than at the inlets 152a of the orifices 152.

A solution for the design of the assemblies of the air-bleeding orifices 152-chimney 150 is the use of so-called fugitive fibres. These are three-dimensionally woven fibres, typically carbon fibres, held together by resin, which are then dissolved by a chemical process to form said assemblies. One could also consider weaving the blades 148 around small-diameter pipes and in a material similar to that of the fugitive fibres in order to dissolve them by the same chemical process. The diameter D of these designs will be sized according to the suction flow required to reduce the intensity of the swirl of the leading edge.

The internal chimneys 150, e.g. one per blade, are elongated in radial direction and are substantially parallel to the radial shape of the blades 148.

Figure 8:
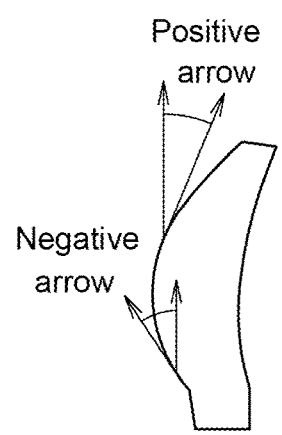
FIG. 8 is a schematic axial view of a blade, useful for understanding the invention.
Figure 9:
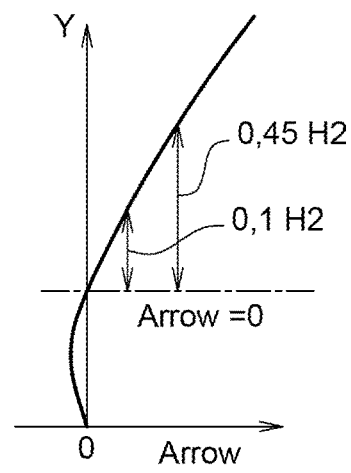
FIG. 9 is a diagram showing the value of the arrow along the radial axis of the blade.

The inlets 152a of the air-bleeding orifices 152 are radially arranged in an area H1 contained between 10% and 45% of the height H2 of the blade, i.e. between 0.1 H2 and 0.45 H2 (FIGS. 7 and 9), and measured above the arrow zero. The arrow zero is defined as the radial height of the blade where the tangent of the leading edge is radial, i.e. parallel to the radial axis Y (FIGS. 8 and 9). The radial axis Y is orthogonal to the longitudinal axis X of the turbomachine. The outlets of the air bleed outlet orifices 158 are advantageously arranged in an area H3 contained between 85% and 100% of the blade height, measured from the root of the blade.

For best suction performance, an optimum pressure difference should be maintained. For this purpose, the inlets 152a of the air-bleeding orifices 152 are advantageously arranged axially in an area L1 contained between 0% and 30%, and in particular contained between 10% and 30%, of the local chord L2, measured from the leading edge 138. By local chord, we mean the chord measured at the radial height of the inlet 152a considered. The chord L2 is thus, for a given orifice inlet 152a height, the shortest path/line that connects the leading edge 138 to the trailing edge 140. Similarly, the outlets of the air bleed orifices 158 are advantageously arranged axially within a range of 0% to 60% (preferably 0% to 15%) of the local chord, measured from the leading edge. The 0% of the area corresponds to the outlets of air outflow orifices 158 arranged on the leading edge.

Advantageously, the air inflow orifices 152a are arranged only in the areas H1 and L1 of the blade 148 and the air outflow orifices 158 are arranged only in the area H3 in order to effectively reduce the leading edge swirls of the upstream blade before they bind to the top swirl of the downstream blade.

The leading edge swirl forms at the leading edge 138 as the name implies and tends to move away from it as it moves up and down the blade. The objective is to suck in/reduce the energy of this swirl and send the flow towards the top of the blade with a direction that follows the arrow of the blade.

Figure 6:
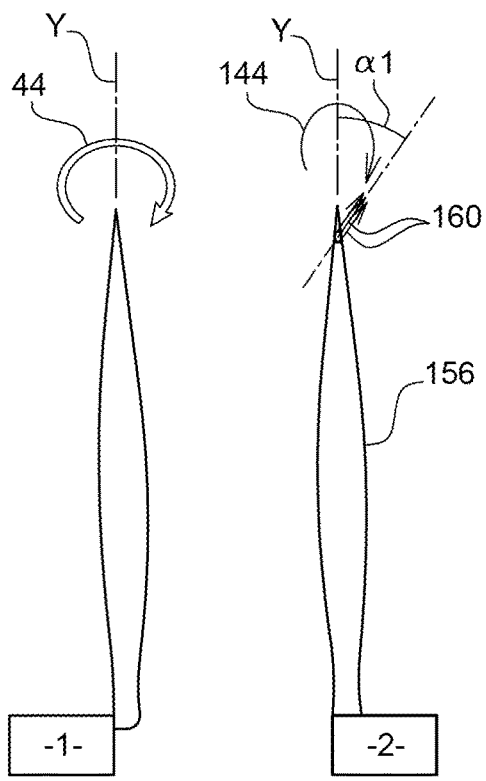
FIG. 6 is a schematic view of a blade of the upstream propeller of a turbine, side view of the leading edge side, without and with the air-bleeding circuit of the invention.
Figure 7:
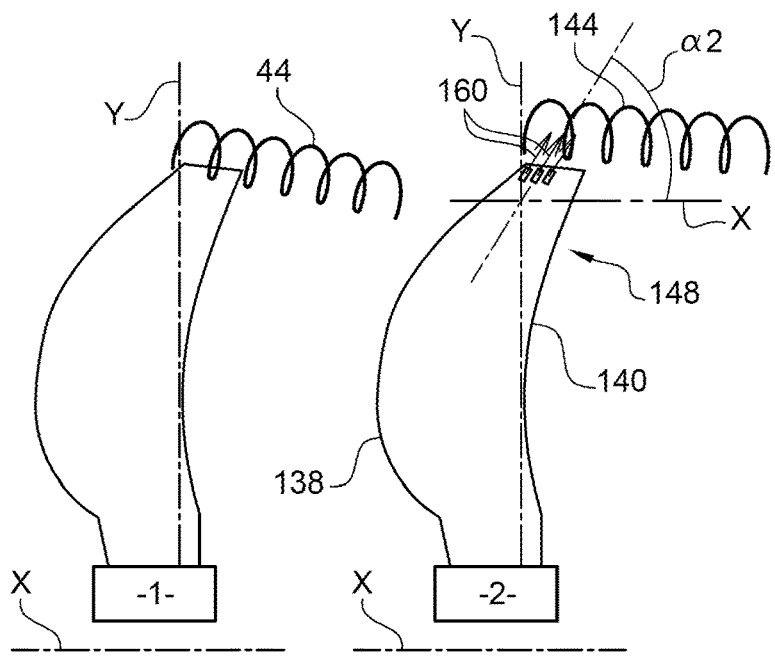
FIG. 7 is a schematic view of a blade of the upstream propeller of a turbine, side view of the suction side, without and with the air-bleeding circuit of the invention.

The ejection of the flow should also help to reduce the intensity of the blade top swirl and move its position radially away from its direction of flow. As shown in FIGS. 6 and 7, in both the configuration 1 (without the air-bleeding circuit) and the configuration 2 (with the air-bleeding circuit), the blade end swirl 144 is less energetic in the configuration 2 than the swirl 44 in the configuration 1 and therefore generates less loss, thereby increasing the efficiency of the turbomachine. In addition, the swirl intensity 144 is reduced in configuration 2 and the swirl 144 is radially spaced in configuration 2, thus preventing the swirl 144 from impacting the downstream blade. This avoids increasing the radius of the downstream blade to gain performance or reduce the interaction noise between the upstream and downstream propeller.

The angle α1, α2 of air ejection at the top of the blade is advantageously oriented towards the trailing edge 140 of the blade 148 and also towards the top of the blade 148. The direction of air ejection is illustrated by the arrows 160 (FIGS. 6 and 7).

This angle α1, α2 of air ejection with respect to the longitudinal axis X of the turbomachine, or equivalently with respect to the radial axis Y, is thus advantageously between 0° and 90°. As shown in FIG. 7, the ejection angle α2 is approximately 50° with respect to the longitudinal axis X. As shown in FIG. 6, the air is ejected advantageously from the suction side 156 side. The angle α1 between the radial axis Y of the blade and the direction of air ejection can be between 0° and 90°.

It is about 40° in FIG. 6.

The invention thus has several advantages:
- a reduction in the interaction noise of the leading edge swirl: acoustic gain,
- a reduction in the interaction noise of the blade end swirl: acoustic gain,
- a reduction in leading edge swirl losses: gain in performance of the turbomachine,
- a reduction in blade end swirl losses: gain in performance of the turbomachine.

The system according to the invention reduces the boundary layer that develops at mid-span on the suction side of the upstream blade by placing the suction ports between 10% and 45% of the height of the blade above the arrow zero and, near the leading edge, between 10% and 30% chord. This reduces the swirl at its source at the lower side of the blade. The air outflow orifices advantageously open at the suction side of the upstream blades, close to the leading edges and the peaks of the blades, thus reducing the intensity of the top swirl, as close as possible to where it is created.

The advantages of the invention are:
- a reduction in the energy of the top swirl, thanks to the holes which open at as close as possible to the place where the top swirls are created, at the leading edge of the upstream blade,
- a reduction of the detachment on the suction side of the upstream vane, thanks to the suction holes positioned in the blade,
- a reduction of the interaction noise at the low speed points, by reducing the swirl created at the lower side of the blade, thanks to the suction of the boundary layer on the suction side at this span of the blade.

The intensity of the top swirl is also reduced by blowing at the top blade.

Figure 10:
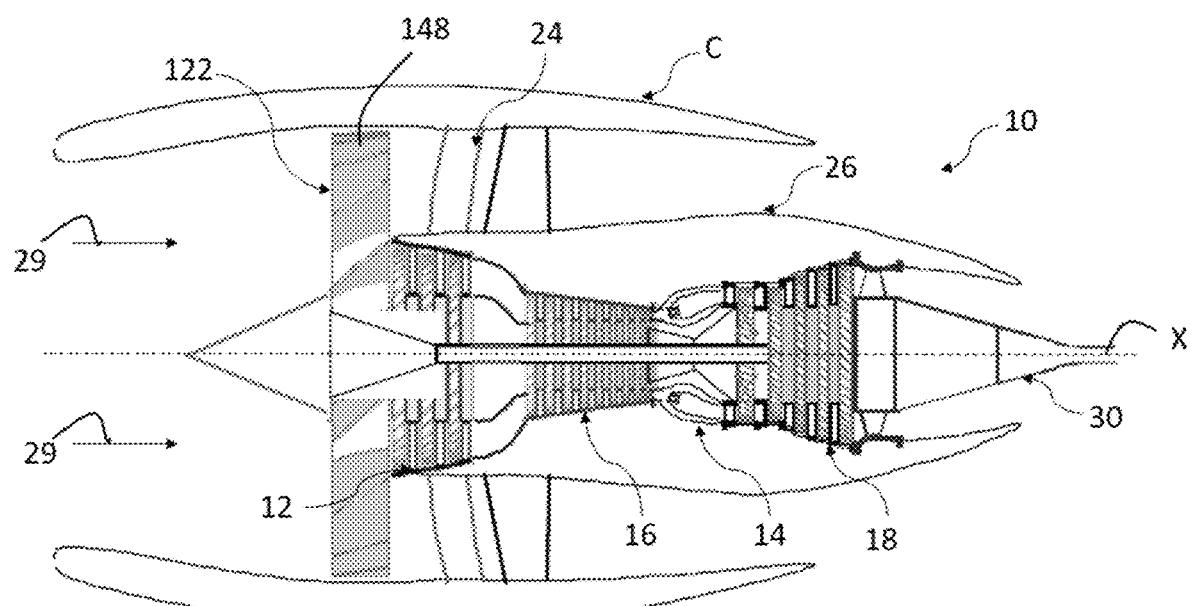
FIG. 10 is a schematic axial section view of a turbomachine with ducted propellers.

In the above description, the upstream and downstream propellers of the turbomachine are described as unducted and counter-rotating in a turbomachine. However, the invention is not limited to this configuration and also concerns turbomachines comprising ducted upstream and downstream propellers, whether counter-rotating or non-contra-rotating. An example of a turbomachine 10 comprising a duct C, extending around upstream and downstream propellers 122, 24, is illustrated in FIG. 10.

The invention claimed is:

1. A turbomachine with a longitudinal axis, comprising two, respectively upstream and downstream, coaxial outer propellers,
   wherein at least some blades of the upstream propeller comprise at least one internal air circulation chimney that communicates on the one hand with air-bleeding orifices in boundary layers of the at least some of the blades, and communicates on the other hand with air outflow orifices on a radially outer end thereof,
   the air-bleeding orifices opening at orifice inlets on suction sides of the at least some of the blades,
   the orifice inlets of the air-bleeding orifices being radially arranged only in a first area contained between 10% and 45% of a radial dimension of the at least some of the blades, the radial dimension is measured above and from a radial height of the at least some of the blades for which a tangent of a leading edge of the at least some of the blades is orthogonal to the longitudinal axis,
   the orifice inlets of the air-bleeding orifices being arranged only in a second area contained between 0% and 30% of a local chord of the at least some of the blades, measured at the level of said orifice inlets and from the leading edges of the at least some of the blades.

2. The turbomachine according to claim 1, wherein said at least one internal air circulation chimney is substantially radial.

3. The turbomachine according to claim 1, wherein the air-bleeding orifices have an elongated or oblong cross-section.

4. The turbomachine according to claim 1, wherein the air outflow orifices opening at the outside of the at least some of the blades at the level of orifice outlets, said orifice outlets being arranged in a third area contained between 0% and 60% of the local chord of the at least some of the blades, measured at the level of said orifice outlets and from the leading edges of the at least some of the blades.

5. The turbomachine according to claim 1, wherein the air outflow orifices open at the outside of the at least some of the blades at orifice outlets, said orifice outlets being arranged radially in a fourth area contained between 85% and 100% of the radial dimension of the at least some of the blades, and measured from roots of the at least some of the blades.

6. The turbomachine according to claim 5, wherein said air outflow orifices are arranged only in said fourth area of the radial dimension of the at least some of the blades.

7. The turbomachine according to claim 1, wherein the air outflow orifices open at the suction sides of the at least some of the blades.

8. The turbomachine according to claim 7, wherein the air outflow orifices are oriented towards the top of the at least some of the blades so that, in axial section, an angle between a radial axis of the at least some of the blades and a direction of air ejection is between 0° and 90°.

9. The turbomachine according to claim 7, wherein the air outflow orifices are oriented on a side of the suction sides of the at least some of the blades in such a way that, in radial section, an angle between the radial axis of the at least some of the blades and a direction of air ejection is between 0° and 90°.

10. The turbomachine according to claim 1, wherein the upstream and downstream propellers have substantially the same outer diameter.

11. The turbomachine according to claim 1, wherein the upstream and downstream propellers are unducted and counter-rotating.

12. The turbomachine according to claim 1, wherein the upstream and downstream propellers are ducted and counter-rotating or non-counter-rotating.

* * * * *